United States Patent [19]

Dosaj et al.

[11] 4,247,528

[45] Jan. 27, 1981

[54] METHOD FOR PRODUCING SOLAR-CELL-GRADE SILICON

[75] Inventors: Vishu D. Dosaj; Lee P. Hunt, both of Midland, Mich.

[73] Assignee: Dow Corning Corporation, Midland, Mich.

[21] Appl. No.: 28,947

[22] Filed: Apr. 11, 1979

[51] Int. Cl.³ .............................................. C01B 33/02
[52] U.S. Cl. .............................. 423/350; 156/616 R; 23/296
[58] Field of Search .................... 423/350; 156/616 R; 23/296

[56] References Cited

U.S. PATENT DOCUMENTS 3,071,444  1/1963  Theurer ................................ 423/350

FOREIGN PATENT DOCUMENTS 1530655  6/1968  France ...................................... 423/350
49-37686 10/1974 Japan ....................................... 423/350

OTHER PUBLICATIONS

Haas et al., "Bureau of Mines Report of Investigation 7207", 1968, pp. 1-21.

Primary Examiner—Jack Cooper
Attorney, Agent, or Firm—Howard W. Hermann

[57] ABSTRACT

Silica is reduced in a direct arc reactor by activated carbon or carbon black having relatively low boron (B) and phosphorus (P) contents to produce silicon having similarly low B and P contents and suitable for use in photovoltaic cells for converting solar energy directly to electrical energy.

7 Claims, No Drawings

METHOD FOR PRODUCING SOLAR-CELL-GRADE SILICON

The invention described herein was made in performance of work under NAS Contract No. NAS7-100 and is subject to the provisions of Section 305 of the National Aeronautics and Space Act of 1958 (72 Stat. 435; 42 USC 2457).

BACKGROUND OF THE INVENTION

The present invention relates generally to methods for producing silicon and more particularly to a method for producing solar-cell-grade silicon which may be utilized as a material of construction for photovoltaic cells which convert solar energy directly into electrical energy.

Silicon employed in photovoltaic cells must have a relatively high degree of purity in order efficiently to convert solar energy into electrical energy. It is particularly important for the solar-cell-grade silicon to have a very low amount of elements from groups III and V of the Periodic Table of Elements, especially boron and phosphorous.

Silicon employed as a material for semiconductors has a relatively high degree of purity, but semiconductor-grade silicon is produced by a relatively expensive process, and the expense is too great to be commercially practical for solar-cell-grade silicon.

It would be desirable to produce solar-cell-grade silicon employing a simple, relatively inexpensive smelting process heretofore utilized to produce metallurgical-grade silicon. In this smelting process, silica ($SiO_2$) is reduced by a carbonaceous reducing agent in a high temperature furnace, such as a direct arc reactor (DAR), or any type of electric furnace or an arc plasma furnace. However, the silicon produced by such a method has a relatively high degree of impurities (e.g. only about 98% pure). These impurities comprise metals, such as Al, Cr, Fe, Ti, V and Zr, among others, as well as boron and phosphorous. Most of the metallic impurities in metallurgical-grade silicon can be removed with purifying processes after the smelting operation. However, there is no known process for reducing boron and phosphorous under commercially practicable conditions to levels sufficiently low as to no longer significantly impair the efficiency of the solar cell to convert solar energy directly to electrical energy. Although boron and phosphorous are reduced to these low levels in the production of semiconductor-grade silicon, the process for doing so is too expensive to be commercially practicable for solar-cell-grade silicon.

In the production of metallurgical-grade silicon, a typical carbonaceous reducing agent is composed of a mixture of wood chips, coal and coke. This particular carbonaceous reducing agent is highly reactive with the silica and produces 75–85% yields of silicon, but the resulting silicon has relatively large amounts of boron and phosphorous, too large to produce high-efficiency solar cells. Unpurified charcoal, another carbonaceous reducing agent utilized in a method employing a direct arc reactor, also has a relatively high degree of reactivity with the silica and produces relatively high yeilds of silicon, but, like the carbonaceous reducing agents comprising a mixture of wood chips, coal and coke, the unpurified charcoal also produces silicon having relatively large amounts of boron and phosphorous.

Another possible carbonaceous reducing agent for silica is petroleum coke, but this carbonaceous agent, by itself, is a rather poor reductant for silica, and the yields of silicon employing this particular carbonaceous reducing agent are relatively low.

In summary, the carbonaceous reducing agents heretofore employed in the reduction of silica in a direct arc reactor either have produced silicon with excessive boron and phosporous contents, or they have a relatively low reactivity with silica, giving a rather low yield of silicon and thus are not practical from a commercial standpoint.

SUMMARY OF THE INVENTION

In a method in accordance with the present invention, the silica is reduced in a direct arc reactor with a carbonaceous reducing agent selected from the group consisting of activated carbon and carbon black. Both the activated carbon and the carbon black are commercially available with boron and phosphorous contents sufficiently low that the amount of boron and phosphorous carried over into the resulting silicon metal is tolerably low. In addition, both the activated carbon and the carbon black are sufficiently reactive with silica to give a relatively high yield of silicon, comparable to, or better than, the yield in conventional processes for producing metallurgical-grade silicon.

Activated carbon is available as extruded pellets or in powder form while carbon black is normally available in powder form. The carbonaceous powders should be pelletized or briquetted when used in a method for producing silicon in accordance with the present invention. The carbonaceous powders are typically formed into pellets approximately ½ inch (12.5 mm) in diameter, in one embodiment, using high-purity binders such as sugar, starch, polyvinyl alcohol or celluloses (e.g. hydroxypropyl cellulose). A high-purity binder is one that contains relatively low amounts of boron and phosphorous so as not to affect adversely the boron and phosphorous content of the resulting silicon.

Including sugar in the pellets can increase the yield. The silicon yield can also be enhanced by including in the pellets one or more of the following ingredients: silica sand, silica flour or colloidal silica.

The effect of the sugar and silica constitutents in the carbonaceous pellets on the yield of silicon can be better appreciated from the following discussion of the chemical reactions involved in a process for reducing silica with carbonaceous reducing agents in a direct arc reactor. In such a process the following chemical reactions occur:

(1) $SiO_2 + C \rightarrow SiO + CO$
(2) $SiO + C \rightarrow SiC + CO$
(3) $2SiO_2 + SiC \rightarrow 3SiO + CO$
(4) $SiO + SiC \rightarrow 2Si + CO$ The direct arc reactor contains an upper zone of relatively low temperature and a lower zone of relatively high temperature. Silica and carboneous reducing agent are charged into the top of the direct arc reactor, and molten silicon metal is tapped from the bottom of that reactor. The SiO produced by reactions (1) and (3) is gaseous.

The SiO gas produced by reactions (1) and (3) rises upwardly through the charge bed and comes in contact with the carbonaceous reducing agent to form SiC. The SiC formed in the upper (low temperature) zone of the furnace moves downwardly to react with SiO in the lower (high temperature) zone of the furnace yielding molten silicon.

Factors which promote the formation of reactive SiC increase the yield of the process. When a carbon pellet has a relatively low density, there is a greater surface area of carbon with which the SiO gas may react to form SiC. Accordingly, the greater the carbon surface with which the SiO may react, the greater the amount of SiC produced and the greater the yield of silicon. The amount of carbon surface available to react with the SiO gas increases with a decrease in density of the carbon pellet.

When sugar is used as a binder for the pellets of carbonaceous reducing agent, the sugar, on burning, expands, causing the pellet to open up thus increasing the surface area of the pellet and enhancing its reaction with SiO to form SiC.

The charge introduced into the direct arc reactor may be provided with sugar cubes or lump sugar mixed with (but not part of) the pellets or briquettes of carbonaceous reducing agent. These sugar lumps or cubes expand during heating to increase the surface area of carbon available to react with SiO.

The silicon yield from a method in accordance with the present invention is substantially greater than 50% by weight and typically at least about 70% or better (e.g. 80-95%). Yield refers to the amount of Si in the $SiO_2$ reactant which is converted to silicon product.

Molten silicon is tapped from the direct arc reactor and then subjected to a unidirectional solidification process employing conventional equipment, such as a Czochralski crystal grower. As tapped from the direct arc reactor, silicon produced in accordance with the present invention has an aim boron content of about 8 ppm (parts per million) by weight, max. and an aim phosphorous content of about 15 ppm by weight, max. After unidirectional solidification, the resulting solar-cell-grade silicon has a boron content no greater than 7 ppm by weight, and a phosphorous content no greater than 5 ppm by weight. In comparison, metallurgical-grade silicon has boron and phosphorous contents of about 40 ppm and 80 ppm respectively.

Other features and advantages are inherent in the method claimed and disclosed or will become apparent to those skilled in the art from the following detailed description.

DETAILED DESCRIPTION

The direct arc reactor is an electric furnace conventionally employed for metallurgical processing, and the like. The furnace interior is in the form of a vertically disposed cylinder, and a carbon electrode extends downwardly from the top of the furnace. The furnace charge, consisting essentially of silica and the carbonaceous reducing agent, is introduced into the direct arc reactor through the top, and metallic silicon is tapped from the furnace through a tap hole at the bottom of the furnace. The direct arc reactor and its construction are essentially conventional and form no part of the present invention. However, the furnace interior and the carbon electrode should be composed of materials which do not contribute significantly to the impurities (such as B or P) in the silicon tapped from the furnace.

The silica in the charge is typically quartz or quartzite, a compact, granular rock composed of quartz. Silica powder may also be used, and this embodiment will be described in greater detail below. The silica is commercially available with, and should be obtained with, a boron content no greater than 10 ppm by weight and a phosphorous content no greater than 20 ppm by weight.

The carbonaceous reducing agent may be either activated carbon or carbon black. Each of these carbonaceous materials is commercially available in a relatively pure form having a boron content no greater than 10 ppm by weight and a phosphorous content no greater than 10 ppm by weight. These are the aim boron and phosphorous contents in a carbonaceous reducing agent employed in accordance with the present invention.

The activated carbon may be produced from petroleum-based carbon powder activated by subjecting it to a water-gas reaction in an oxidation atmosphere at elevated temperatures. Alternatively, the petroleum-based carbon powder may be activated by treatment with acid following calcination. The manner in which the activated carbon is produced does not form a part of the present invention, and conventional commercially available activated carbons may be utilized so long as they have the relatively low boron and phosphorous contents set forth above.

One form of commercially available carbon black which may be used is produced by thermal decomposition of natural gas or oil. As is the case with activated carbon, the manner in which the carbon black is produced does not form a part of the present invention, and any commercially available carbon black may be utilized so long as it conforms to the requirements noted above with respect to low boron and phosphorous contents.

Activated carbon is commercially available as extruded pellets while carbon black is available as powder and should be pelletized before it is introduced into the direct arc reactor as part of the furnace charge. A powdered carbonaceous reducing agent is formed into pellets of the desired size using high-purity binders such as sugar, starch, polyvinyl alchohol and various celluloses (e.g. hydroxypropyl cellulose). The sizing of the pellets is discussed below. A high-purity binder is one in which the levels of undesired impurities (such as B or P) are sufficiently small so that the amount carried over from the binder to the silicon produced by the DAR is so low as to impart no substantial increase to the aim B and P contents of the DAR silicon (8 ppm B and 15 ppm P).

The various carbon black or activated carbon powders differ in powder particle size, but differences in powder particle size are irrelevant since the powders are pelletized or briquetted before being employed in the method of the present invention.

Another ingredient which may be included in the pellets of carbonaceous reducing agent is a silica constitutent such as silica sand, silica flour or colloidal silica. These enhance the formation of SiC, as noted above. Silica flour is a more finely ground form of silica sand. Sugar and starch binders in the pellets could burn out during the smelting operation, and, if this would cause the pellets to lose their coherence, the presence of colloidal silica or silica flour would help hold the pellets together.

Sugar cubes or lump sugar may be mixed with the pellets. These sugar lumps or sugar cubes are not part of the pellets, per se, but are exterior of the pellets and, upon heating, increase the surface area of carbon in the charge bed.

There are other impurities, besides B and P, present in either the silica or the carbonaceous reducing agent, but these are removed to insignificantly low levels during the unidirectional solidification process to which the silicon is subjected after tapping from the direct arc reactor. These other impurities include Al, Ca, Cr, Cu, Fe, Mm, Mo, Ni, Ti, V and Zr. However, relatively large amounts of these impurities in the silicon from the DAR have an adverse effect on the silicon yield from the unidirectional solidification step, so that the total impurity level in the DAR silicon should be controlled to no more than about 400 ppm by weight to give a sufficient yield from unidirectional solidification. This can be accomplished by providing the silica and the carbonaceous reducing agents in relatively, pure form so that the impurities carried over to the DAR silicon fall within the 400-ppm-by-weight limit.

With respect to boron (B) and phosphorous (P), about 80% of the P and about 35% of the B is removed from the silicon during the smelting process in the DAR. However, very little B or P are removed during unidirectional solidification because they have relatively high segregation coefficients. Accordingly, in order to provide solar-cell-grade silicon (i.e. the silicon after unidirectional solidification) with a maximum B content of 7 ppm by weight and a maximum P content of 5 ppm by weight, the respective B & P contents in the DAR silicon must be no higher than about 8 ppm by weight for B and about 15 ppm by weight for P.

Set forth below are a number of examples of methods employing the present invention. The method of each example was performed in a 200-kVA direct arc reactor having a 6-inch-diameter carbon electrode. In each of the examples, the carbon content is expressed as a percent of the stoichiometric amount of carbon required to reduce the particular amount of silica charged into the furnace. In order to optimize operation of the DAR it may become necessary to vary the carbon percentage from time to time. Accordingly, the carbon content is expressed as an average over the entire period of time of the smelting operation of that example. The carbon content described in the examples reflects only that carbon added as carbonaceous reducing agent. A small proportion of the carbon which enters into the silica-reducing reaction comes from the carbon electrode, which is preferably composed of purified graphite. To the extent that this electrode may contain some of the above-described undesired impurities, these are present only in amounts so low that whatever is carried over to the DAR silicon is insufficient to raise the B or P above their maximum permissible levels in the DAR silicon.

Examples 1 through 5 and 9 summarize the use of carbon black powder pelletized with high-purity binders such as starch, starch and colloidal silica, starch and silica flour, and sugar. Colloidal silica or silica flour was used with the binder to enhance the formation of SiC. Examples 6, 7 and 8 summarize either the use of activated carbon pelletized with sugar or activated carbon mixed with sugar cubes to increase the porosity and lower the density of the charge bed. In all examples, the silica was in the form of quartz.

EXAMPLE 1

The carbon reductant was carbon black pelletized with 10 wt. % colloidal silica and 8.8 wt. % modified maize starch as the binder.

The smelting operation was performed for 31 hours. The average carbon content of the furnace charge was 85% of stoichiometric for the silica in the charge. A total of 28 kg of silicon was tapped, and the energy consumption for the silicon production averaged 36.4 kWh/kg Si.

EXAMPLE 2

The carbon reductant was carbon black pelletized in two batches. The first batch of pellets was made using 10 wt. % starch, and the second batch of pellets was made using 10 wt. % starch and 10 wt. % colloidal silica. The reductant mixture was made up with 50 % of pellets from each batch. The smelting operation was carried out for 36 hours at an average carbon content in the charge bed of 92%. A total of 56 kg of silicon was produced at an average energy consumption of 33.9 kWh/kg Si.

EXAMPLE 3

The carbon reductant was carbon black pelletized with 10 wt. % modified maize starch. The smelting operation was carried out for 27 hours at an average carbon content of 98.4%. A total of 15 kg of silicon was produced at an average energy consumption of 78 kWh/kg Si.

EXAMPLE 4

The carbon reductant was carbon black pelletized with 10 wt. % modified maize starch and 10 wt. % silica flour. The smelting operation was carried out for 24 hours at an average carbon content of 100%. A total of 31 kg of silicon was produced at an average energy consumption of 43 kWh/kg Si.

EXAMPLE 5

The carbon reductant was carbon black pelletized with 30 wt. % sugar. The smelting operation was carried out for 50 hours at an average carbon content of 97%. A total of 128 kg of silicon was produced at an average energy consumption of 27 kWh/kg Si.

EXAMPLE 6

The carbon reductant was activated carbon made from a petroleum-based powder that had been activated and then pelletized or pelletized and then activated. The smelting operation was carried out for 35 hours at an average carbon content of 99%. A total of 56 kg of silicon was produced at an average energy consumption of 29 kWh/kg Si.

EXAMPLE 7

The carbon reductant was activated carbon with sugar cubes. The activated carbon material was petroleum-based, extruded to 4mm pellet size and acid washed. The activated carbon pellets were mixed with sugar cubes whose fixed carbon content constituted 15 wt. % of the total carbon content in the charge. The furnace was operated for 60 hours at an average carbon content of 93%, producing 100 kg of silicon at an average energy consumption of 33 kWh/kg Si. The use of sugar cubes as a part of the raw material charge gave additional carbon surface area on which the SiO gas could react to produce SiC.

EXAMPLE 8

The carbon reductant was activated carbon pelletized with sugar. The activated carbon was prepared from lignite in very fine powder form (300 mesh). The powder was pelletized with 25 wt. % sugar. The smelting operation was carried out for 23 hours at an average carbon content of 100%. A total of 33 kg of Si was produced at an average energy consumption of 28 KWh/kg Si.

EXAMPLE 9

The carbon reductant was carbon black, derived from natural gas, pelletized with 25 wt. % sugar. The smelting operation was carried out for 58.4 hours with an average carbon content of 99%. A total of 128 kg of silicon was produced at an average energy consumption of 25.7 kWh/kg Si.

A photovoltaic cell composed of silicon operates at optimum efficiency from the standpoint of converting solar energy to electrical energy when the resistivity is in the range of about 0.1 to 0.3 ohm-cm. Below 0.1 ohm-cm., conversion efficiency drops more sharply than it does above 0.3 ohm-cm. There is a slight increase between 0.1 and 0.3 ohm-cm. With the above-described B and P contents in the solar-cell-grade silicon, the desired conversion efficiency can be obtained.

Silicon produced in accordance with the method of Example 9 was used to fabricate solar cells by each of two fabricators. One fabricator reported the bulk resistivity of the silicon at 0.1 ohm-cm, and fabricated 24 solar cells. The efficiency of the antireflection-coated cells varied from 9.5 to 13.4% Air Mass 1 (AM1). The second fabricator made 12 solar cells having individual efficiencies between 8.2 and 12.0% AM1 with an average efficiency of 10.6%.

The density of various carbon reductants is summarized in Table 1. For comparison purposes, also listed are the densities of charcoal, wood chips and of sugar as well as the density of the carbon reductant used for commercial metallurgical silicon production, a coal, coke and wood chip mixture. The carbon reductant with the lowest density is lignite-based, activated carbon pelletized with sugar.

In the activated carbon sugar pellets, not only was the density rather low at 443 g/l, which is desirable, but, also, sugar on burning expands causing the pellet to open up, thus increasing the surface area of the pellet and enhancing its reaction with SiO to form SiC. Carbon black pelletized with sugar has a similar advantage.

TABLE 1

| Carbon Reductant | Example | Density |
|---|---|---|
| Carbon black pelletized with Silica and Starch | Example No. 1,2 | 590 g/l |
| Carbon black pelletized with Silica flour and starch | Example No. 4 | 578 g/l |
| Carbon black pelletized with starch | Example No. 3 | 535 g/l |
| Carbon black pelletized with 30% sugar | Example No. 5 | 504 g/l |
| Carbon black pelletized with 25% sugar | Example No. 9 | 562 g/l |
| Activated carbon pellets | Example No. 6 | 536 g/l |
| Activated carbon pelletized with sugar | Example No. 8 | 443 g/l |
| Acid washed activated carbon with 20% sugar | Example No. 7 | 520 g/l |
| Coal, coke and wood chips | Commercial Mixture | 645 g/l |
| Sugar | — | 497 g/l |
| Charcoal | — | 302 g/l |
| Wood Chips | — | 189 g/l |

The silicon production rate using various binders is summarized in Table 2. Silica flour or colloidal silica when pelletized with carbon black using the appropriate binder, gave relatively high yields of silicon. This is expected due to the intimate contact of the carbon black powder with the silica in the pellet, thus increasing the carbon conversion to SiC.

Carbon black pelletized with sugar gave the maximum silicon production rate with least energy consumption. The silicon production rate, using carbon black pelletized with (1) starch and (2) silica flour or colloidal silica, was much higher compared to carbon black pelletized with starch alone. Activated carbon either pelletized with sugar or mixed with sugar cubes as part of the charge also resulted in high silicon production rates at low energy consumption. The higher silicon production rates may be attributed to greater conversion of SiO to SiC due to increased carbon surface area. In the case of activated carbon, the high silicon rate may be attributed to the active carbon sites available in the carbon. The activated carbons have micro or macropores which increase the extent of the SiO reaction with carbon and result in higher formation of SiC.

Impurity analyses of silicon from the direct arc reactor (DAR), using various carbon reductants are summarized in Table 3. Silicon produced by using activated carbon or carbon black was of much higher purity compared to the silicon produced by using either (1) coal, coke and wood chips or (2) charcoal.

TABLE 2

| Method | Carbonaceous Reducing Agent | Silicon Prod. Rate kg/h | Energy Consumption kWh/g |
|---|---|---|---|
| Example No. 1 | Carbon black pelletized with colloidal silica and modified maize starch | 1.7 | 35 |
| Example No. 2 | Carbon black pelletized with starch and colloidal silica | 2.1 | 34 |
| Example No. 3 | Carbon black pelletized with modified maize starch | .93 | 78 |
| Example No. 4 | Carbon black pelletized with silica flour and modified maize starch | 1.8 | 43 |
| Example No. 5 | Carbon black pelletized with 30% sugar | 2.85 | 27 |
| Example No. 6 | Petroleum based, activated carbon | 1.8 | 29 |
| Example No. 7 | Acid washed, petroleum based activated carbon pellets mixed with 20% sugar cubes | 1.82 | 33 |
| Example No. 8 | Lignite based, activated carbon pelletized with 25% sugar | 2.0 | 28 |
| Example No. 9 | Carbon black pelletized with 25% sugar | 2.49 | 25.7 |
| Commercial Metallurgical grade silicon production | Coal, coke, and wood chips | 1.7 | — |

TABLE 2-continued

| Method | Carbonaceous Reducing Agent | Silicon Prod. Rate kg/h | Energy Consumption kWh/g |
|---|---|---|---|
| — | Charcoal | 1.97 | 35 |

TABLE 3

Analysis of Silicon From DAR, Using Different Carbon Reductants, With Impurities Expressed As PPM By Weight

| Impurity | Coal Coke Wood Chips | Char-coal | Carbon Black-Starch Pellets (Example 3) | Carbon Black Starch-Colloidal Silica Pellets (Examples 1,2) | Carbon Black-Starch and Silica Flour Pellets (Example 4) | Carbon Black Sugar Pellets (Examples 5,9) | Pet. Base Activated Carbon Pellets (Example 6) | Lignite Base Activated Carbon Pelletized With Sugar (Example 8) | Pet. Base Activated Carbon Pellets Mixed With Sugar Cubes (Example 7) |
|---|---|---|---|---|---|---|---|---|---|
| Al | 3400 | 110 | 320 | 280 | 80 | 100 | 70 | 270 | 320 | 150 |
| B | 35 | 57 | 6 | 11 | 13 | 9 | 6.7 | 6 | 7 | 4 |
| Ca | 480 | 3412 | 80 | 300 | 40 | 40 | 50 | <10 | <10 | 60 |
| Cr | 290 | <10 | <10 | <10 | <10 | <10 | <10 | <10 | <10 | <10 |
| Cu | 70 | 16 | <5 | <5 | <5 | <5 | <5 | 8 | 45 | <5 |
| Fe | 7100 | 5450 | 2700 | 470 | 50 | 50 | 80 | 1100 | 14,000 | 460 |
| Mn | 180 | 400 | <10 | 10 | <10 | <10 | <10 | <10 | 150 | <10 |
| Mo | — | <10 | <10 | <10 | <10 | <10 | <10 | <10 | <10 | <10 |
| Ni | 80 | 100 | 50 | <10 | <10 | <10 | <10 | 10 | 50  10 | |
| P | 40 | 140 | 10 | 11 | 10 | 3 | 0.45 | 22 | 34 | 9 |
| Ti | 330 | 55 | 40 | 40 | 20 | <10 | <10  30 | 50 | 30 | |
| V | 170 | <10 | <10 | <10 | <10 | <10 | <10 | <10 | <10 | <10 |
| Zr | 20 | <10 | <10 | <10 | <10 | <10 | <10 | <10 | <10 | <10 |

The silicon yield from the various examples is set forth in Table 4. Yield, expressed as a percent of silicon in the quartz reacted in the DAR, varied from 79% to 95%, compared to a typical yield of 75% to 80% in the production of metallurgical grade silicon using a conventional process employing the DAR. For those examples in which sugar was employed with the activated carbon or carbon black, the yield was in the range 92%–95%.

TABLE 4

| Example | Carbonaceous Reducing Agent | Yield Wt. % |
|---|---|---|
| 1 | Carbon black pelletized with colloidal silica and starch | 89.1 |
| 2 | Carbon black pelletized with colloidal silica and starch | 84.2 |
| 3 | Carbon black pelletized with starch | 79 |
| 4 | Carbon black pelletized with silica flour and starch | 81.2 |
| 5 | Carbon black pelletized with 30% sugar | 92.6 |
| 6 | Petroleum based, activated carbon | 90.5 |
| 7 | Acid washed, petroleum based activated carbon pellets mixed with 20% sugar cubes | — |
| 8 | Lignite based activated carbon pelletized with 25% sugar | 95.2 |
| 9 | Carbon black pelletized with 25% sugar | 94 |

The yield was calculated by measuring (a) the amount of silicon tapped and (b) the amount of silicon in the $SiO_2$ fumes collected in a bag house used in conjunction with the DAR, and then by computing yield as follows:

$$\text{Yield, wt.\%} = \frac{(a)}{(a) + (b)} \times 100$$

When the silica part of the furnace charge is quartz or quartzite, the silica is in the form of particles whose size varies with the size of the furnace. In a 200-kVA furnace, a laboratory size furnace of the type used in the foregoing examples, the particle size may be in the range 1–2 inches. In a 6,000 kVA-furnace (the smallest commercial size) the particle size could be larger, in the range 4–6 inches. These particles are fed into the furnace as part of a mixture also including pellets or briquettes of carbonaceous reducing agent.

In another embodiment of the invention, the silica part of the charge may be provided as silica sand pelletized or briquetted with the carbonaceous reducing agent in the appropriate stoichiometric proportions, i.e. approximately 1 mole of silica to 2 moles of carbonaceous reducing agent. In this embodiment, substantially all of the silica and substantially all of the carbonaceous reducing agent are physically combined together in particles to enhance the reactivity due to the close contact between the silica and the carbon. Such particles may be either pellets or briquettes.

Silica sand occurs naturally as such or it may be obtained by crushing quartz. The silica sand should have a size of about 80% minus 200 mesh before pelletizing, for example, and about 80% minus 40 mesh before briquetting, although particles of sand up to ¼ inch can be briquetted with appropriate binders.

The binders for these pellets or briquettes of silica/carbon are the same as those described above for pellets or briquettes consisting essentially of carbon, i.e., starch, sugar, colloidal silica and silica flour.

The pellet size depends upon the size of the furnace, no matter whether the pellets are silica/carbon or essentially carbon. For a small, laboratory size 200-kVA furnace, a typical pellet size is ½ inch. For a commercial size furnace of 10,000 kVA, the pellet size would be 1–2 inches, for example.

Although the processes conducted in the examples described above employed a direct arc reactor (DAR), other high-temperature furnaces could be used, and the method of the present invention is not restricted to direct arc reactors. Other high-temperature furnaces which may be employed include other types of electric arc furnaces as well as arc plasma furnaces. The criteria which should be satisfied by a furnace employed in a method of the present invention are that the furnace provide temperatures sufficiently high to process silica and that, in the course of producing these high temperatures, no extraneous impurities are introduced in amounts which would adulterate the silicon end product to undesirably high levels. As used herein, the phrase "high-temperature furnace" refers to a furnace which satisfies the criteria described in this paragraph.

The unidirectional solidification process, to which the molten silicon is subjected for purification purposes, may employ a conventional Czochralski crystal grower, or conventional Bridgman technology or other process wherein a bath or molten silicon is gradually frozen from one end of the bath to the other. In all of these processes, the molten silicon is gradually solidified, part by part, in a single predetermined direction, and the impurities are substantially isolated in that part of the silicon which remains molten the longest.

The foregoing detailed description has been given for clearness of understanding only, and no unnecessary limitations should be understood therefrom, as modifications will be obvious to those skilled in the art.

We claim:

1. In a method for producing silicon wherein silica is reduced in a high temperature furnace by a carbonaceous reducing agent mixed with the silica, the improvements comprising:

employing silica having a boron content of no greater than 10 parts per million by weight and a phosphorous content no greater than 20 parts per million by weight, employing a carbonaceous reducing agent selected from the group consisting of activated carbon and carbon black and having a boron content no greater than 10 parts per million by weight and a phosphorous content no greater than 10 parts per million by weight, and the carbonaceous reducing element being in the form of pellets whereby a solar grade of silicon is produced.

2. In a method as recited in claim 1 wherein:

said pellets contain a high-purity binder selected from the group consisting of starch, sugar, polyvinyl alcohol and celluloses.

3. In a method as recited in claim 1 comprising:

providing within said pellets at least one of the group consisting of silica sand, silica flour and colloidal silica to enhance the conversion to silicon of said silica which is not within said pellets.

4. In a method as recited in claim 1 wherein:

said pellets are mixed with sugar to increase the surface area of the carbon in said high temperature furnace.

5. In a method as recited in claim 1 wherein:

substantially all of said silica and substantially all of said carbonaceous reducing agent are physically combined together in pellet form in substantially stoichiometric proportions.

6. In a method as recited in claim 5 wherein:

said silica is in the form of silica sand.

7. In a method for producing silicon as defined in claim 1 wherein the improvements further comprise tapping silicon from the furnace in molten form and then subjecting the molten silicon to unidirectional solidification to isolate impurities in the portions thereof which are the last to remain molten, which portions are then discarded, wherein the silicon remaining has a boron content no greater than 7 parts per million by weight and a phosphorous content no greater than 5 parts per million by weight.

* * * * *

UNITED STATES PATENT AND TRADEMARK OFFICE
CERTIFICATE OF CORRECTION

PATENT NO. : 4,247,528
DATED : January 27, 1981
INVENTOR(S) : Vishu D. Dosaj; Lee P. Hunt It is certified that error appears in the above-identified patent and that said Letters Patent are hereby corrected as shown below:

In Column 1, line 64; the word "yeilds" should read "yields".

In Column 8, Table 2, Column 4; the heading of column 4 reading "Energy Consumption kWh/g" should read "Energy Consumption kWh/kg".

In Column 9, Table 2-continued, Column 4, the heading of column 4 reading "Energy Consumption kWh/g" should read "Energy Consumption kWh/kg".

In Column 10, Table 3, Column 8 with the heading Carbon Black Sugar Pellets (Examples 5,9); delete the number "30".

In Column 10, Table 3, Column 9 with the heading Pet. Base Activated Carbon Pellets (Example 6); the number reading "50" should read "30".

UNITED STATES PATENT AND TRADEMARK OFFICE
CERTIFICATE OF CORRECTION Page 2 of 2

PATENT NO. : 4,247,528
DATED : January 27, 1981
INVENTOR(S) : Vishu D. Dosaj; Lee P. Hunt It is certified that error appears in the above-identified patent and that said Letters Patent are hereby corrected as shown below:

In Column 10, Table 3, Columns 10 and 11 should read

| Lignite Base Activated Carbon Pelletized With Sugar (Example 8) | Pet. Base Activated Carbon Pellets Mixed With Sugar Cubes (Example 7) |
|---|---|
| 320 | 150 |
| 7 | 4 |
| <10 | 60 |
| <10 | <10 |
| 45 | <5 |
| 14,000 | 460 |
| 150 | <10 |
| <10 | <10 |
| 50 | 10 |
| 34 | 9 |
| 50 | 30 |
| <10 | <10 |
| <10 | <10 |

Signed and Sealed this

First Day of September 1981

[SEAL]

Attest:

GERALD J. MOSSINGHOFF

*Attesting Officer*  *Commissioner of Patents and Trademarks*